UNITED STATES PATENT OFFICE.

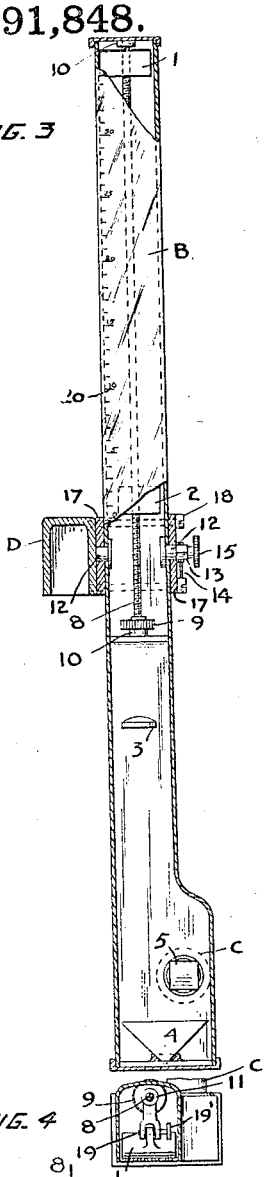
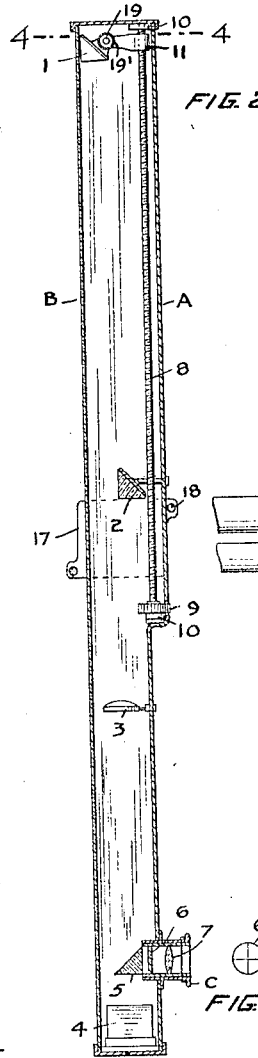
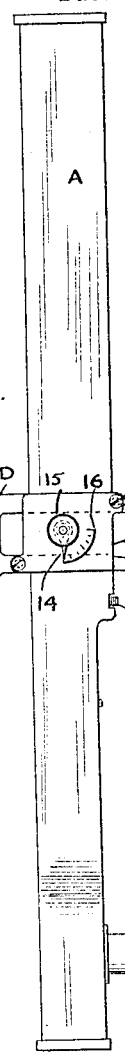
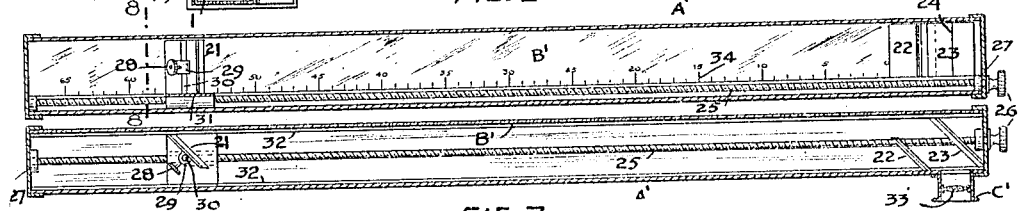
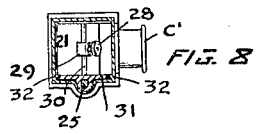

GRAVES GRIFFITH, OF SAN FRANCISCO, CALIFORNIA.

RANGE-FINDER.

1,291,848.

Specification of Letters Patent.

Patented Jan. 21, 1919.

Application filed May 28, 1917. Serial No. 171,423.

*To all whom it may concern:*

Be it known that I, GRAVES GRIFFITH, a citizen of the United States, residing at San Francisco, in the county of San Francisco and State of California, have invented new and useful Improvements in Range-Finders, of which the following is a specification.

This invention relates to improvements in means for ascertaining the distance of an object from the observer without requiring any calculating, and is of the type known as "constant angle variable base finders" and is adapted to be used in maritime, military, civil engineering, photographic and other services.

One of the principal objects of the invention is to provide a device of the type named that will have such construction and arrangement of optical parts as will permit of its use as a combination range-finder and gun-sight, or as a combination range-finder and periscope, or as a combination range-finder, periscope and gun-sight, without additions to or alterations from that when designed for the restricted field of distance finding alone.

Another object of the invention is to provide a device of the character named, having a transparent front portion, as a part of its casing, whereon are graduations constituting a fixed scale, the said graduations being reflected to the observer's eye through the same agency as are the incident rays from the object, the movable part contributing to this being the only one in the device's construction.

A further object of the invention is to provide a device of the type named that will permit of such modification, through the elimination of the more expensive optical parts necessary to the more perfect instrument of precision, as will fit it for use on cameras as an attachment for focusing, and render possible the construction, also, of a simple and cheap instrument readily within the reach of sportsmen and others.

An additional object of the invention is to improve upon the structure as shown and described in my Patents #959,338 and #1,152,171 and bearing dates respectively of May 24, 1910, and August 31, 1915.

In the accompanying drawings, forming a part of this application, similar characters refer to similar parts, throughout.

Figure 1 is a side elevation, showing the instrument as a combination range-finder, periscope and gun-sight, applied to a firearm. Fig. 2 is a vertical side elevation, in section, showing the arrangement of the optical system, and the means for actuating the coincidence-producing and scale-reflecting prism. Fig. 3 is a front elevation, sectioned, showing arrangement of optical system, means for actuating the coincidence-producing and scale-reflecting prism, and the transparent scale-bearing front portion of the casing. Fig. 4 is a cross-section on the line 4—4. Fig. 5 is a glass disk, having an etched cross upon its surface. Fig. 6 is a longitudinal vertical section of a modified form of the instrument, showing the transparent scale-bearing front, the arrangement of the optical system and the means for actuating the coincidence-producing and scale-reflecting reflector. Fig. 7 is a horizontal section at right angles to that shown in Fig. 6 and shows the arrangement of the optical system and the means for actuating the coincidence-producing and scale-reflecting reflector. Fig. 8 is a cross-section of Fig. 6 on the line 8—8.

Referring more particularly to the drawings, A represents the casing of the instrument, supported by trunnions 12 resting in bearings in plates 17, the said plates being secured to each other and also to the firearm D by means of bolts 18, or other suitable device. The outer surface of one of said plates has inscribed thereon a graduated arc 16, having therefor an index 14, fitted to a shouldered portion 13 of one of said trunnions, the said trunnion having also a clamping screw 15. Within said casing are a threaded shaft 8, carried in bearings 10 and having an enlarged concentric portion 9, the milled periphery of which extends through and slightly beyond the surface of said casing, affording means whereby the said shaft is rotated, and an optical system comprising a coincidence-producing and scale-reflecting prism 1, pivotally connected to an arm 19 and having a clamping screw 19′ for securing said prism in adjustment, a threaded opening 11 in said arm for engaging the thread on the said shaft, affording thereby a means whereby, through revolving the said shaft, the said prism may be translated along a line paralleling that of the optical axis of the instrument, a fixedly mounted direct ray prism 2, lying in a plane paralleling that of the aforesaid prism, an objective glass, means for focusing not shown, a double reflecting prism 4, positioned in a plane at right angles to the planes of the two aforesaid prisms, an ocular prism 5, lying in a plane paralleling the planes of the two first mentioned prisms, a glass disk having an etched cross thereon and occupying a position at, or near, the image plane, and a bifocal lens 7 for viewing scale and image reflections.

Constituting parts of the said casing are a transparent front portion B, having upon its surface scale graduations 20, the said transparent portion being of a length equal to that of the extreme limit of base of the instrument and of a width approximately that of the prism 1, and an eyepiece C, located at any desired distance beyond the objective 3.

In the modification, as represented in Figs. 6, 7 and 8, the objective 3, double reflecting prism 4 and disk 6, shown in Figs. 2 and 3, have been eliminated, and plain reflectors 21, 22 and 23 substituted for the prisms 1, 2 and 5, as there shown. Aside from these modifications, and certain minor changes in construction, to which attention will be directed later, the principle and operation remain essentially that as shown in Figs. 2 and 3.

Referring again to Figs. 6, 7 and 8, A' represents the casing of the modification, of which C' is the eyepiece and B' is the transparent front upon whose inner surface are the scale graduations 34. The reflectors 21, 22 and 23, together with the bifocal lens 33, constitute the optical system. Of these said reflectors, 21 and 22 lie in parallel planes; the last named being fixedly mounted and inclined at an angle of forty-five degrees to the axis of the instrument. The first named of the said reflectors is pivotally, or rotatably, mounted on a post 30, by means of a sleeve 29, having a set-screw 28. The said post forms a part of a base-plate 31, dovetailed to slide in a recessed guideway 32 and having a threaded opening, or other means, for engaging the threads of the shaft 25, the rotation of said shaft being the means whereby the said plate is caused to move along said guideway, this being accomplished by rotating the knurled knob 26. The reflector 23 is oppositely disposed to that of the two initial ray-receiving reflectors 21 and 22 and inclined at an angle of forty-five degrees to the axis of the instrument, fixedly secured, and has etched, centrally and perpendicularly, through the silvering of its back, a line 24, serving as a medial line dividing the field of view and, also, as an index to the scale reflections.

The adjustment of the instrument is simple and is confined to the prism, or reflector, to which movement is permitted. Having determined upon the base limit and the limit of range for that particular extreme base limit, and graduated the scale to read from zero to that selected range limit, the prism 1, or in the modification, reflector 21, is moved to the extreme base limit and the instrument directed upon an object whose calculated distance is that of the selected range limit. The prism 1, or the reflector 21, is now turned about its supporting axis until coincidence of the two images is produced, the limit of scale, as reflected by prism 5, or reflector 23, coinciding with the calculated distance, and indicated by the horizontal arm of the etched cross on 6, or by the foot of the etched line 24 on reflector 23. With the prism 1, or reflector 21, clamped or otherwise secured in adjusted position, all distances lying between base limits, as provided for a particular instrument, may be measured by bringing about coincidence of images of objects located at those distance points. Though the extreme limit of base has here been made use of in the adjustment, adjustment is not necessarily confined to this method, as any measured distance and scale division as a measure of that distance will as well serve the purpose. In illustration, let five yards be the distance and scale graduation 1 the measure for it. Move the incident ray reflecting means to a point in alinement with graduation 1 and bring about coincidence of images in manner prescribed. Since 1 division or graduation of scale is a measure for five yards of distance, each additional scale division will be a measure for an additional five yards, and this will hold true throughout any base length up to infinity, if such a base length were possible.

Assuming that adjustment has been made in the manner prescribed, the operation of the instrument, as illustrated in Figs. 1, 2, 3, 4 and 5, is as follows:

Direct the instrument upon the object whose distance is desired, bringing the image reflected by prism 2 to occupy the lower half of the field, as bounded by the horizontal line of the etched cross 6. With conditions as above, turn 9, revolving shaft 8, until prism 1 has been brought to the point producing coincidence of the image reflected by it with the image reflected by prism 2, their line of demarcation being the horizontal line of the etched cross 6, the extreme right of this line also serving as an index to the reflected scale graduation indicating the measure for the desired distance. It is to be observed that reflections of scale graduations do not pass through the objective, but to one side of it, and are subjected to the same number of reflections as are the light rays that do pass through it, and that the purpose of the bifocal lens 7 is to enable the observer to view both scale graduation reflections and those of images, as though occupying the same image plane, and that the images are superposed and the field divided horizontally by the horizontal line of the cross 6.

In the modification, as represented by Figs. 6, 7 and 8, the operation, assuming adjustment to have been made here, as in the instrument previously described, is, in manner, the same as in that case. The instrument, being directed upon an object, receives the direct rays therefrom upon the reflector 22, from which they are reflected to reflector 23 and from thence, through the bifocal lens 33, to the eye of the observer. The incident rays from object and scale graduations are received by reflector 21, from which they are reflected to reflector 23 and thence, through the bifocal lens 33, to the eye of the observer. The field, in this arrangement, is divided vertically by the line 24, this being also the line of coincidence and demarcation, the foot of which is the index to the reflected scale graduation indicating the measure of distance. To secure coincidence of images, the shaft 25 is revolved by turning the knurled knob 26, causing the plate 31 to travel along the recessed guideway 32, by engagement of its threaded portion with the threads of said shaft, carrying with it its members 28, 29 and 30 and attached reflector 21, until the said reflector has attained the required position.

It is realized that ordinary glass for the transparent, scale-bearing front portion of instrument's casing would, probably, prove unsatisfactory, under certain conditions of severe shock, owing to liability to shatter. This weakness may be obviated by the use of super-glass, an article of manufacture calculated to withstand the heaviest of shocks without shattering.

It is apparent that, though the initial ray, or image receiving prisms 1 and 2 and image receiving reflectors 21 and 22 are shown and described as lying in different and parallel planes, they may be located both in the same plane, one above the other, or one to the right of the other, without departing from the spirit of the invention.

If required, the bisecting line 24 may be illuminated by placing behind reflector 23 illuminating means.

An additional advantage that inheres in this arrangement of optical parts, in an instrument of this type, lies in the possible provision of focusing means for the objective.

I claim:—

1. In an instrument of the character described, a transparent scale-bearing member parallel to a base line, image receiving prisms located in different and parallel planes, one of said image receiving prisms being located at one extremity of the base line, the other of said image receiving prisms being so arranged as to permit of its translation along a line paralleling the said base line and between lines perpendicular to the extremities of the said transparent scale-bearing member, an objective located beyond and coöperating with the said image receiving prisms, a double reflecting prism coöperating with the said objective, an eyepiece prism coöperating with the said double reflecting prism, a transparent disk having a cross thereon, a bifocal eyepiece lens, and a means for varying the distance between the two image receiving prisms by moving one of said image receiving prisms either in or opposite to the direction of image displacement.

2. In an instrument of the character described, a transparent scale-bearing member parallel to a base line, image receiving prisms located in different and parallel planes, one of said image receiving prisms being located at one extremity of the base line, the other of said image receiving prisms being so arranged as to permit of its translation along a line paralleling the said base line, and between lines perpendicular to the extremities of the said transparent scale-bearing member, a lens located beyond and coöperating with the said image reflecting prisms, a double reflecting prism coöperating with the said lens, an eyepiece prism coöperating with the said double reflecting prism, a transparent disk having a cross thereon, a bifocal eyepiece lens, and a means for varying the distance between the two image receiving prisms by moving one of said image receiving prisms either in or opposite to the direction of image displacement, and a means for adjusting one of said image receiving prisms relative to its plane of location.

3. In an instrument of the character described, a transparent scale-bearing member parallel to a base line, image receiving prisms located in different and parallel planes, one of said image receiving prisms being located at one extremity of the base line, the other of said image receiving prisms being so arranged as to permit of its translation along a line paralleling the said base line and between lines perpendicular to the extremities of the said transparent scale-bearing member, an objective located beyond and coöperating with the said image receiving prisms, a double reflecting prism coöperating with the said objective, an eyepiece prism coöperating with the said double reflecting prism, a bifocal eyepiece lens, a means for varying the distance between the two image receiving prisms by moving one of said image receiving prisms either in or opposite to the direction of image displacement, a means for adjusting one of said image receiving prisms relative to its plane of location, and a bisecting means fixed with relation to the final image and scale reflections.

4. In an instrument of the character described, a transparent scale-bearing member parallel to a base line, image receiving prisms located in different and parallel planes, one of said image receiving prisms being located at one extremity of the base line, the other of said image receiving prisms being so arranged as to permit of its translation along a line paralleling the said base line and between lines perpendicular to the extremities of the said transparent scale-bearing member, an objective located beyond and coöperating with the said image receiving prisms, a double reflecting prism coöperating with the said objective, an eyepiece prism coöperating with the said double reflecting prism, a bifocal eyepiece lens, a means for varying the distance between the two image receiving prisms by moving one of said image receiving prisms either in or opposite to the direction of image displacement, a means for adjusting one of said image receiving prisms relative to its plane of location, a bisecting means fixed with relation to the final image and scale reflections, and means for attaching said instrument to a gun and means for indicating the degree of elevation therefor for a certain ascertained range.

5. In an instrument of the character described, a graduated transparent member constituting the base of said instrument, image receiving means located in planes paralleling that of the said transparent scale-bearing member, one of said image receiving means being located in proximity to one extremity of the said transparent scale-bearing member, the other of said image receiving means being so arranged as to permit of its translation along a line paralleling the axis of the said instrument and between lines perpendicular to the extremities of the said scale-bearing member, means for indicating the degree of translation of the said image receiving means, and means for transmitting both the images from the said image receiving means and the said indicated degree of translation of the said translatable image receiving means to the eye of an observer.

In testimony whereof I have hereunto set my hand in the presence of two subscribing witnesses.

GRAVES GRIFFITH.

Witnesses:
H. OVENTHAL,
W. W. HEALEY.

Copies of this patent may be obtained for five cents each, by addressing the "Commissioner of Patents, Washington, D. C."